(12) United States Patent
Sun et al.

(10) Patent No.: US 10,720,978 B1
(45) Date of Patent: Jul. 21, 2020

(54) BEAM DIVERSITY INTERFERENCE MITIGATION

(71) Applicant: Apple Inc., Cupertino, CA (US)

(72) Inventors: Yakun Sun, San Jose, CA (US); Rohit U. Nabar, Sunnyvale, CA (US); Jennifer M. Edwards, San Francisco, CA (US); Simone Paulotto, Redwood City, CA (US); Mithat C. Dogan, San Jose, CA (US); Harish Rajagopalan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/573,507

(22) Filed: Sep. 17, 2019

Related U.S. Application Data

(60) Provisional application No. 62/811,408, filed on Feb. 27, 2019.

(51) Int. Cl.
| | |
|---|---|
| *H04B 7/06* | (2006.01) |
| *H04B 7/0426* | (2017.01) |
| *H04B 7/0417* | (2017.01) |
| *H04B 17/336* | (2015.01) |
| *H04B 17/318* | (2015.01) |

(52) U.S. Cl.
CPC .......... *H04B 7/0639* (2013.01); *H04B 7/043* (2013.01); *H04B 7/0417* (2013.01); *H04B 7/0617* (2013.01); *H04B 7/0695* (2013.01); *H04B 17/318* (2015.01); *H04B 17/336* (2015.01)

(58) Field of Classification Search
CPC ...... H04B 7/02; H04B 7/0408; H04B 7/0413; H04B 7/043; H04B 7/0639; H04B 7/0695; H04B 7/0617; H04B 7/0417; H04B 7/08; H04B 7/082; H04B 7/0808; H04B 7/0814; H04B 7/0817; H04B 17/318; H04B 17/336
See application file for complete search history.

(56) References Cited

U.S. PATENT DOCUMENTS

| | | | | |
|---|---|---|---|---|
| 2016/0127920 | A1* | 5/2016 | Thomas | H04B 7/0617 455/446 |
| 2016/0373175 | A1* | 12/2016 | Harrison | H04B 7/0469 |
| 2018/0331740 | A1* | 11/2018 | Orhan | H04B 17/327 |

* cited by examiner

*Primary Examiner* — Siu M Lee
(74) *Attorney, Agent, or Firm* — Fletcher Yoder PC

(57) ABSTRACT

Methods and systems include reducing or mitigating interference by sweeping multiple beams used to communicate between a wireless network base station and an electronic device. The multiple beams include beams having different sidelobe directions. The electronic device selects, using a processor of the electronic device, a beam from the multiple beams. Furthermore, selecting the beam includes selecting the beam having a lowest level of interference of the multiple beams due to a sidelobe direction of the beam. The electronic device then communicates with the wireless network base station using the selected beam.

21 Claims, 13 Drawing Sheets

BEAM DIVERSITY INTERFERENCE MITIGATION

CROSS-REFERENCE TO RELATED APPLICATIONS

This application claims priority to U.S. Provisional Patent Application No. 62/811,408, entitled "Beam Diversity Interference Mitigation," filed Feb. 27, 2019, which this application incorporates in its entirety for all purposes.

BACKGROUND

The present disclosure relates generally to beam diversity to mitigate interference for user equipment (UE).

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The $3^{rd}$ Generation Partnership Project (3GPP) defines various standards as part of the duties of the collaborative organization. For example, 3GPP has defined a 5G New Radio (NR) Frequency Range 2 (FR2) specification telling the UE and a Next Generation NodeB (gNB) how to communicate using 5G communications. The 3GPP NR FR2 specifies that the UE using beamforming with ultra-wide bandwidth in millimeter wave bands. These bands enable high data-rate communications. Analog beamforming on antenna arrays helps compensate for propagation fading in millimeter wave communications due to the short wavelengths. Each beam has a pattern with a strongest gain in a particular direction. However, the beams may cause interference with one or more other devices (e.g., UE or transmitters).

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "one embodiment," "an embodiment," "embodiments," and "some embodiments" of the present disclosure are not intended to be interpreted as excluding the existence of additional embodiments that also incorporate the recited features.

A 3GPP NR FR2 link is in centimeter or millimeter wave band and relies on beamforming for the connection. Reference signals (RS) are transmitted to obtain and track beams, which is a network overhead used to perform the beamforming. The RS may include a synchronization signal block (SSB) or channel site information reference signal (CSIRS) in a downlink. In the uplink, the RS may include a sounding reference signal (SRS). To improve coverage of the network, multiple transmission reception points (TRPs) are deployed in the network and multiple antenna panels/modules are equipped in the UE.

The UE uses beam sweeps through multiple beams defined in a codebook. Each beam has a pattern with a strongest gain at a particular direction. However, multiple beams have the same direction but may have different sidelobes or grating lobes that point in different directions. 3GPP NR FR2 networks may have a dense network deployment to accommodate the short wavelengths. However, due to the density of such networks, a UE may receive interference or transmit interfering signals to base stations in the network using the sidelobes or grating lobes. Since different beams may be used for a same direction, a beam with a lower level of interference for the UE and/or the network may be selected for the beamforming.

Figure 1:
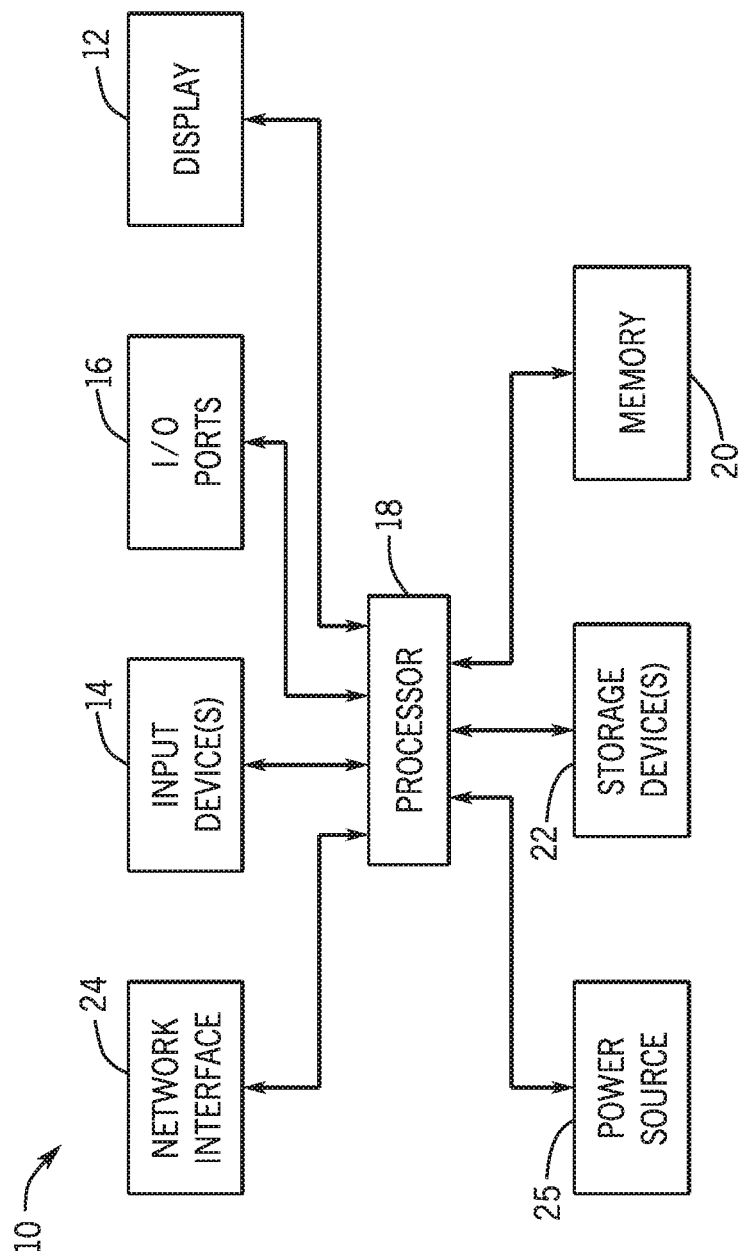
FIG. 1 is a block diagram of an electronic device used to communicate with a base node, in accordance with an embodiment of the present disclosure.

As will be described in more detail below, the electronic device 10 may be any suitable electronic device, such as a computer, a mobile phone, a portable media device, a wearable device, a tablet, a television, a virtual-reality headset, a vehicle dashboard, and the like. Thus, it should be noted that FIG. 1 is merely an example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, local memory 20, a main memory storage device 22, a network interface 24, and a power source 25. The various components described in FIG. 1 may include hardware elements (e.g., circuitry), software elements (e.g., a tangible, non-transitory computer-readable medium storing instructions), or a combination of both hardware and software elements. It should be noted that, in some embodiments, the various depicted components may be combined into fewer components or separated into additional components. For example, the local memory 20 and the main memory storage device 22 may be included in a single component.

As depicted, the processor core complex 18 is operably coupled to the local memory 20 and the main memory storage device 22. Thus, the processor core complex 18 may execute instruction stored in local memory 20 and/or the main memory storage device 22 to perform operations, such as generating and/or transmitting image data. As such, the processor core complex 18 may include one or more processors, such as one or more general purpose microprocessors, one or more application specific processors (ASICs), one or more field programmable logic arrays (FPGAs), graphics processing units (GPUs), or any combination thereof. Furthermore, as previously noted, the processor core complex 18 may include one or more separate processing logical cores that each process data according to executable instructions.

In addition to the executable instructions, the local memory 20 and/or the main memory storage device 22 may store the data to be processed by the cores of the processor core complex 18. Thus, in some embodiments, the local memory 20 and/or the main memory storage device 22 may include one or more tangible, non-transitory, computer-readable media. For example, the local memory 20 may include random access memory (RAM) and the main memory storage device 22 may include read only memory (ROM), rewritable non-volatile memory such as flash memory, hard drives, optical discs, and the like.

As depicted, the processor core complex 18 is also operably coupled to the network interface 24. In some embodiments, the network interface 24 may facilitate communicating data with other electronic devices via network connections. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. In some embodiments, the network interface 24 includes one or more antennas configured to communicate over network (s) connected to the electronic device 10.

Additionally, as depicted, the processor core complex 18 is operably coupled to the power source 25. In some embodiments, the power source 25 may provide electrical power to one or more component in the electronic device 10, such as the processor core complex 18, the electronic display 12, and/or the network interface 24. Thus, the power source 25 may include any suitable source of energy, such as a rechargeable lithium polymer (Li-poly) battery and/or an alternating current (AC) power converter.

Furthermore, as depicted, the processor core complex 18 is operably coupled to the I/O ports 16. In some embodiments, the I/O ports 16 may enable the electronic device 10 to receive input data and/or output data using port connections. For example, a portable storage device may be connected to an I/O port 16 (e.g., universal serial bus (USB)), thereby enabling the processor core complex 18 to communicate data with the portable storage device. In some embodiments, the I/O ports 16 may include one or more speakers that output audio from the electronic device 10.

As depicted, the electronic device 10 is also operably coupled to input devices 14. In some embodiments, the input device 14 may facilitate user interaction with the electronic device 10 by receiving user inputs. For example, the input devices 14 may include one or more buttons, keyboards, mice, trackpads, and/or the like. The input devices 14 may also include one or more microphones that may be used to capture audio. For instance, the captured audio may be used to create voice memorandums. In some embodiments, voice memorandums may include a single-track audio recording.

Additionally, in some embodiments, the input devices 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. The electronic display 12 may control light emission from the display pixels to present visual representations of information, such as a graphical user interface (GUI) of an operating system, an application interface, a still image, or video content, by display image frames based at least in part on corresponding image data. For example, the electronic display 12 may be used to display a voice memorandum application interface for a voice memorandum application that may be executed on the electronic device 10. In some embodiments, the electronic display 12 may be a display using liquid crystal display (LCD), a self-emissive display, such as an organic light-emitting diode (OLED) display, or the like.

Figure 2:
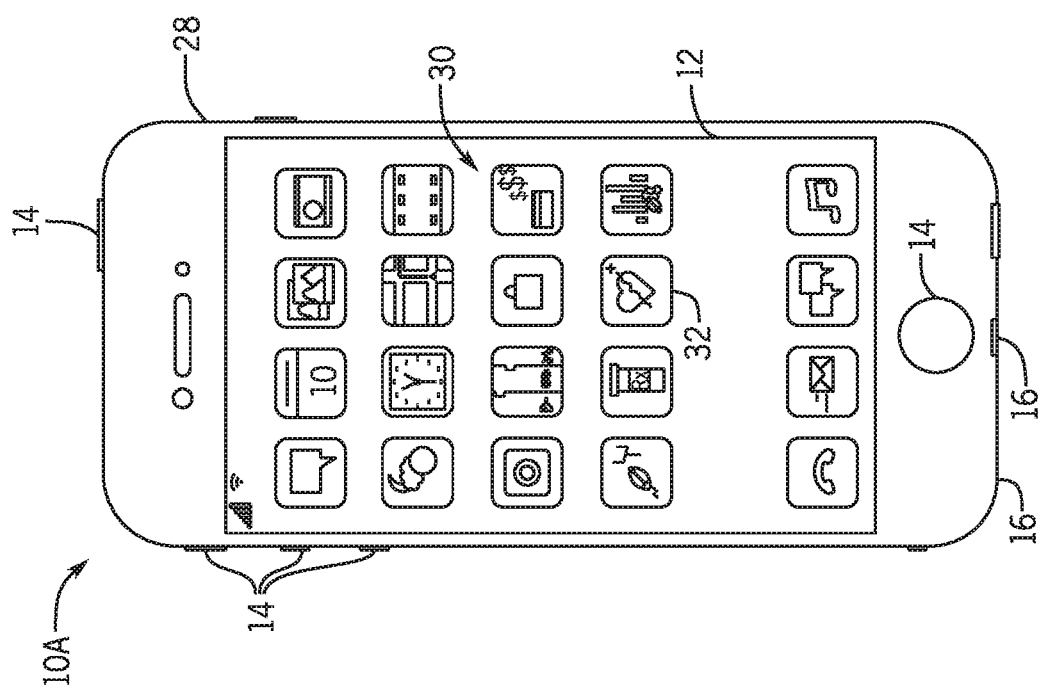
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any IPHONE® model available from Apple Inc.

As depicted, the handheld device 10A includes an enclosure 28 (e.g., housing). The enclosure 28 may protect interior components from physical damage and/or shield them from electromagnetic interference. Additionally, as depicted, the enclosure 28 surrounds at least a portion of the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, a corresponding application may launch.

Furthermore, as depicted, input devices 14 may extend through the enclosure 28. As previously described, the input devices 14 may enable a user to interact with the handheld device 10A. For example, the input devices 14 may enable the user to record audio, to activate or deactivate the handheld device 10A, to navigate a user interface to a home screen, to navigate a user interface to a user-configurable application screen, to activate a voice-recognition feature, to provide volume control, and/or to toggle between vibrate and ring modes. As depicted, the I/O ports 16 also extends through the enclosure 28. In some embodiments, the I/O ports 16 may include an audio jack to connect to external devices. As previously noted, the I/O ports 16 may include one or more speakers that output sounds from the handheld device 10A.

Figure 3:
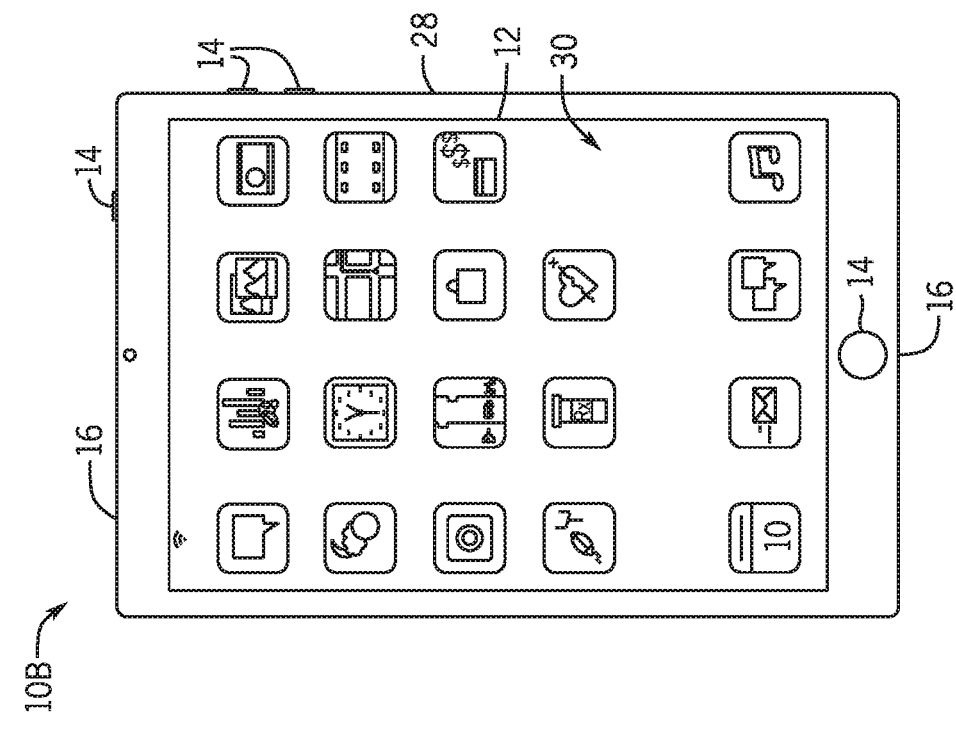
FIG. 3 is another example of the electronic device of FIG. 1, in accordance with an embodiment of the present disclosure.
Figure 4:
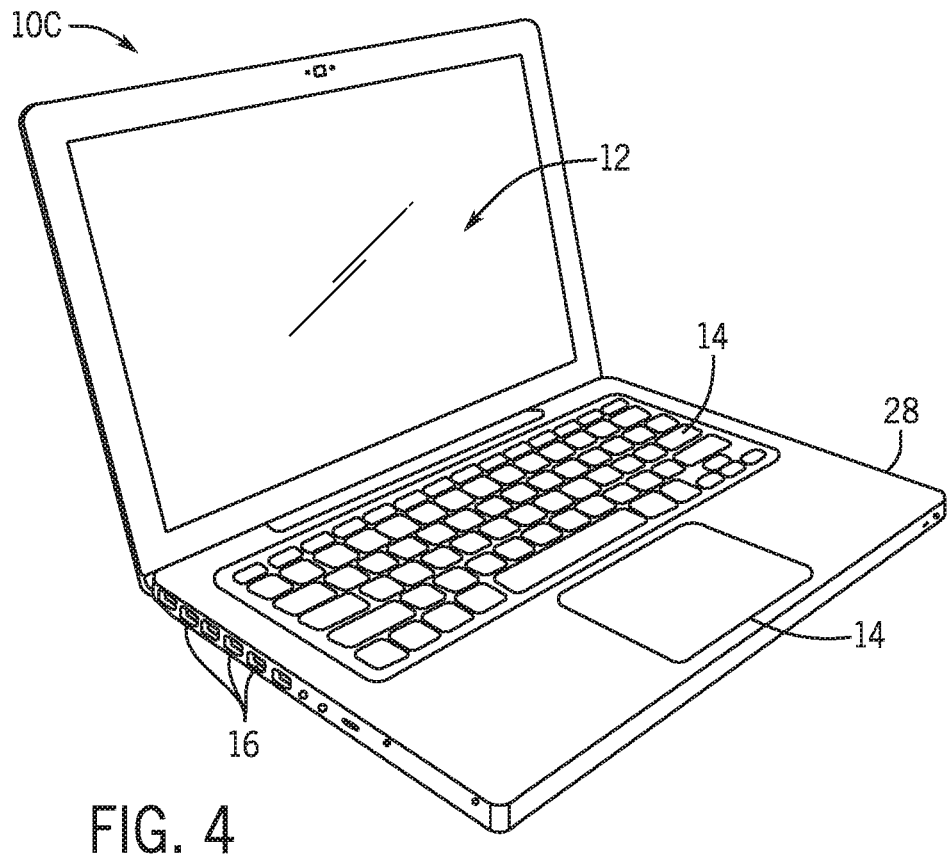
FIG. 4 is another example of the electronic device of FIG. 1, in accordance with an embodiment of the present disclosure.
Figure 5:
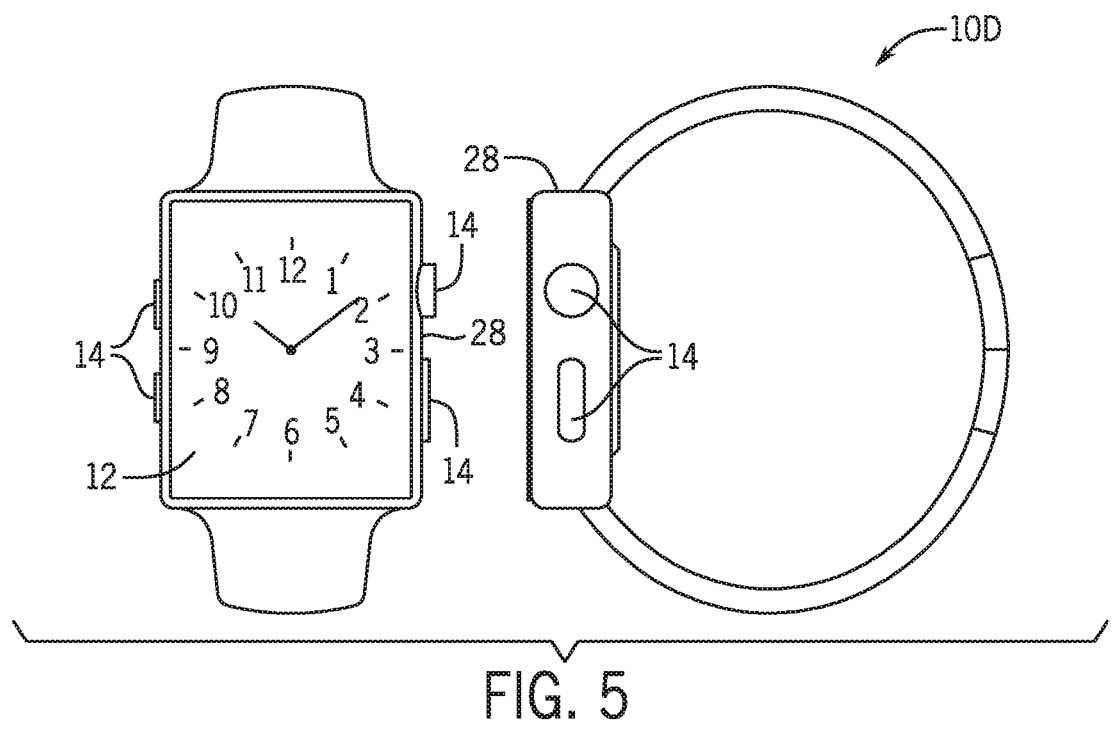
FIG. 5 is another example of the electronic device of FIG. 1, in accordance with an embodiment of the present disclosure.

To further illustrate an example of a suitable electronic device 10, specifically a tablet device 10B, is shown in FIG. 3. For illustrative purposes, the tablet device 10B may be any IPAD® model available from Apple Inc. A further example of a suitable electronic device 10, specifically a computer 10C, is shown in FIG. 4. For illustrative purposes, the computer 10C may be any MACBOOK® or IMAC® model available from Apple Inc. Another example of a suitable electronic device 10, specifically a wearable device 10D, is shown in FIG. 5. For illustrative purposes, the wearable device 10D may be any APPLE WATCH® model available from Apple Inc. As depicted, the tablet device 10B, the computer 10C, and the wearable device 10D each also includes an electronic display 12, input devices 14, and an enclosure 28.

Figure 6:
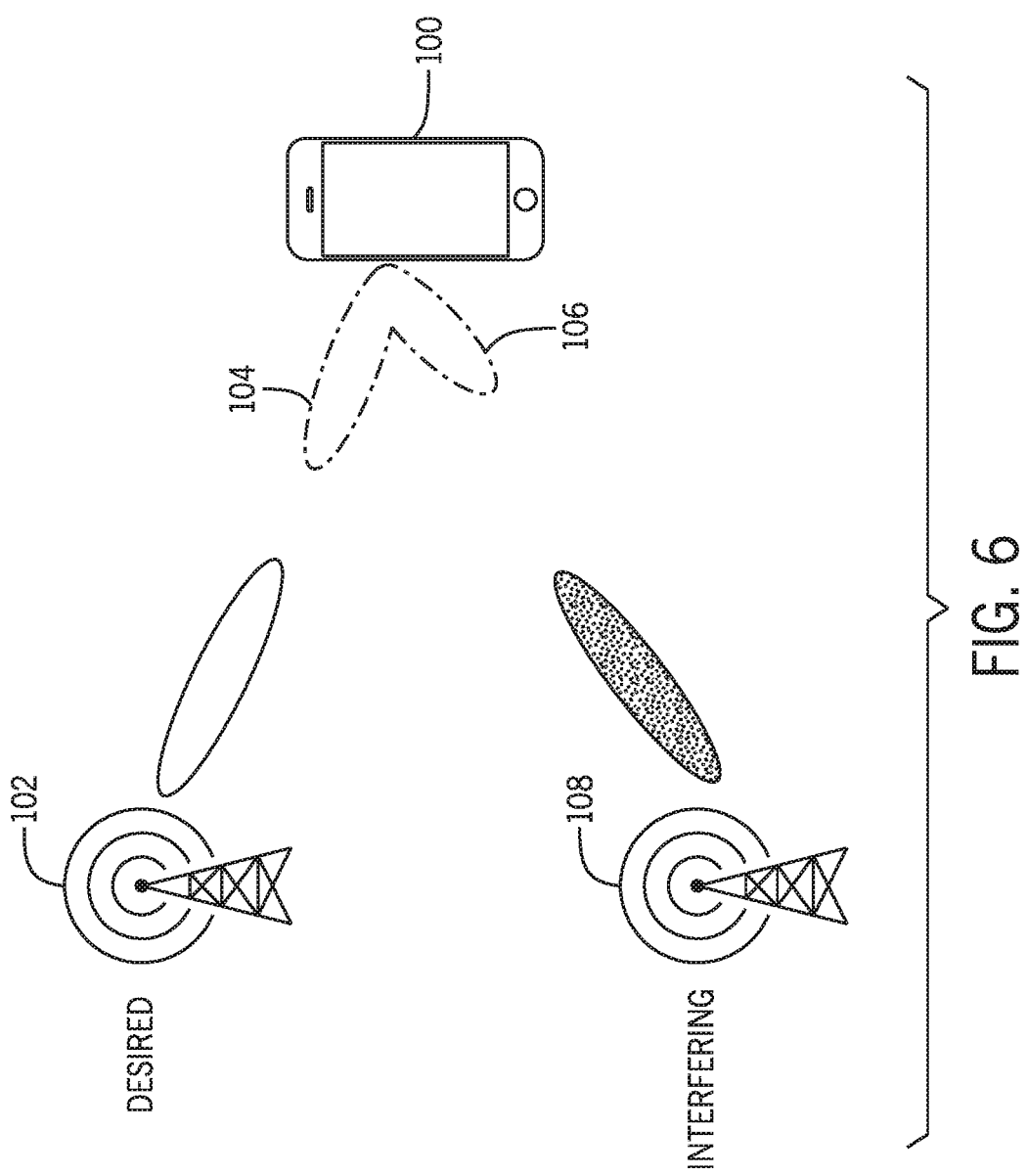
FIG. 6 is a simplified diagram of communication between user equipment (UE) and transmitters, in accordance with an embodiment of the present disclosure.

FIG. 6 is simplified diagram of a UE 100 communicating with a target transmitter 102 using a main lobe 104 of a beam. However, the beam may also have sidelobes or grating lobes. As illustrated, the UE 100 transmits a sidelobe 106. In some networks (e.g., dense millimeter wave networks), the sidelobe 106 may be directed at an interfering transmitter 108. The presence of the sidelobe 106 directed at the interfering transmitter 108 may impede operation of the network and/or the UE 100. In other words, severe interference and low signal-to-interference ration (SIR) may degrade the reception quality and reduce a maximum achievable data rate.

Figure 7:
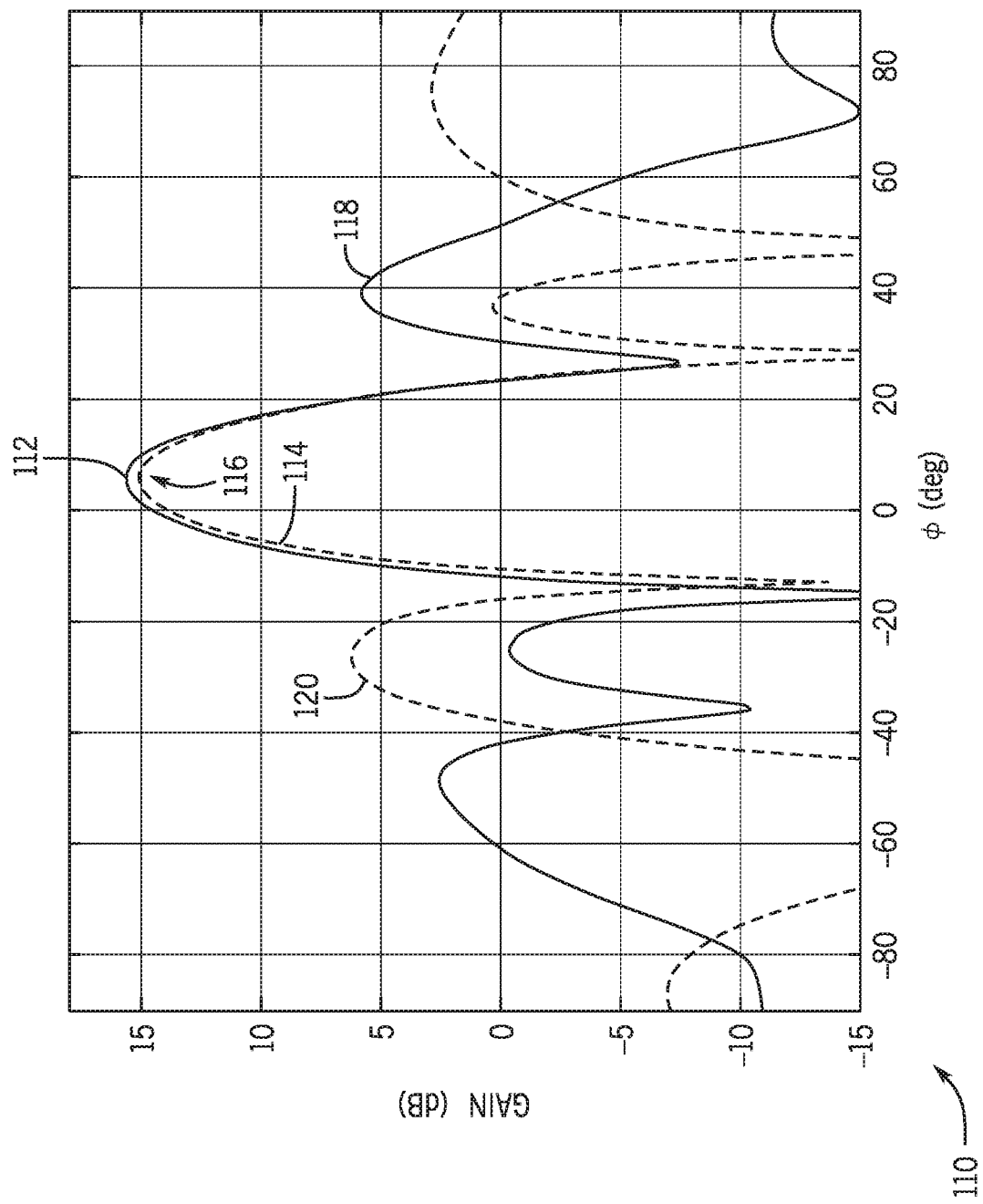
FIG. 7 is a graph of two beams with similar peak directions and different sidelobe directions, in accordance with an embodiment of the present disclosure.

An antenna pattern for a particular beam may have sidelobes pointing in different directions different from the peak gain direction based on the antenna pattern. The sidelobe level may be high especially for an antenna array with a spacing larger than half of the wavelength. In some embodiments, an integration of antennas into a form factor for the UE may also increase the sidelobe level. FIG. 7 is a graph 110 of a first beam 112 and a second beam 114 with different sidelobe patterns but both with a similar peak direction 116. As illustrated, the first beam 112 has a peak sidelobe 118 located left of the peak direction 116. However, the second beam 114 has a peak sidelobe 120 located right of the peak direction 116. As used herein, sidelobe direction is used to refer a peak sidelobe direction (e.g., peak sidelobe 118) for the beam (e.g., first beam 112).

Figure 8:
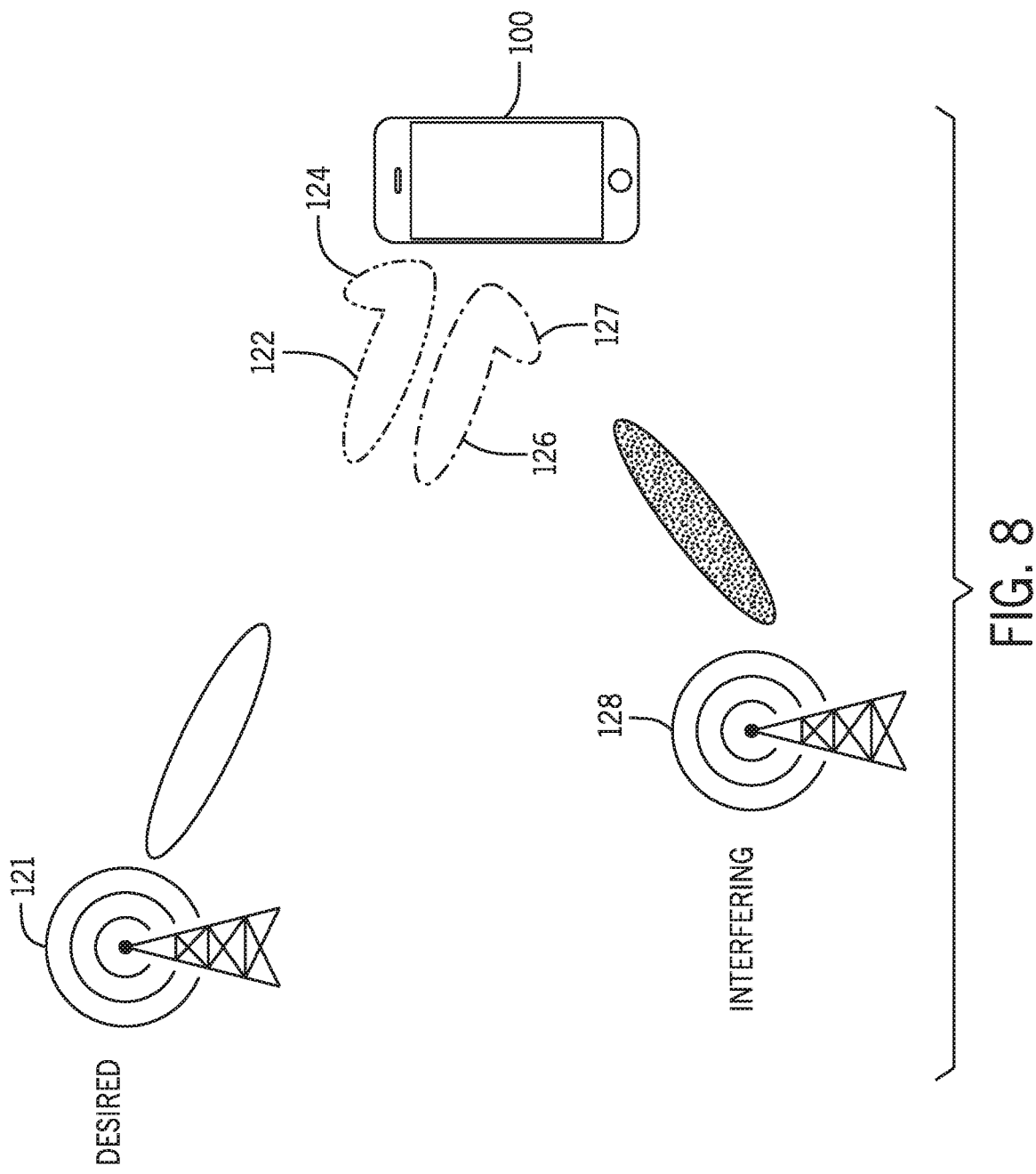
FIG. 8 is a simplified diagram of the UE of FIG. 6 using different possible beam communications with a transmitter, in accordance with an embodiment of the present disclosure.

FIG. 8 illustrates communications with the UE 100 with different possible beams for communication with a target transmitter 121. As illustrated, a first beam 122 having a first sidelobe 124 in a first direction and a second beam 126 having a second sidelobe 127 in a second direction. The first beam 122 and the second beam 126 are both generally directed to the target transmitter 121 with their main beams directed in a common general direction. However, the second beam 126 also includes a second sidelobe 127 directed at an interferer transmitter 128. Thus, the first beam 122 would enable the network and/or the UE 100 to communicate more efficiently.

To take advantage of such beam diversity, a codebook of beams may include multiple beams towards a same rough direction with sidelobes pointing towards different directions. A target transmitter transmits training signals for a receiving beam measurement and selection. The transmitter may either fix the transmitter beam or sweep transmitter beams in a pattern known to the receiver.

The receiver (e.g., UE 100) will sweep some directions in the codebook of beams. The directions swept may include all directions. Additionally or alternatively, the sweeping pattern may include a subset of directions in a coarse pattern where subsequent sweeps are performed with finer granularity. Additionally or alternatively, the sweeping pattern may be based at least partially on previous beam sweeping histories or other information used to assist in determining a direction of a transmitter. For each direction that is swept, multiple beams may be swept pointing to the direction with sidelobes pointing to different directions. The receiver will select the beam among all beams swept with a best signal quality (e.g., best SIR or signal-to-noise-plus-interference ratio (SINR)).

Figure 9:
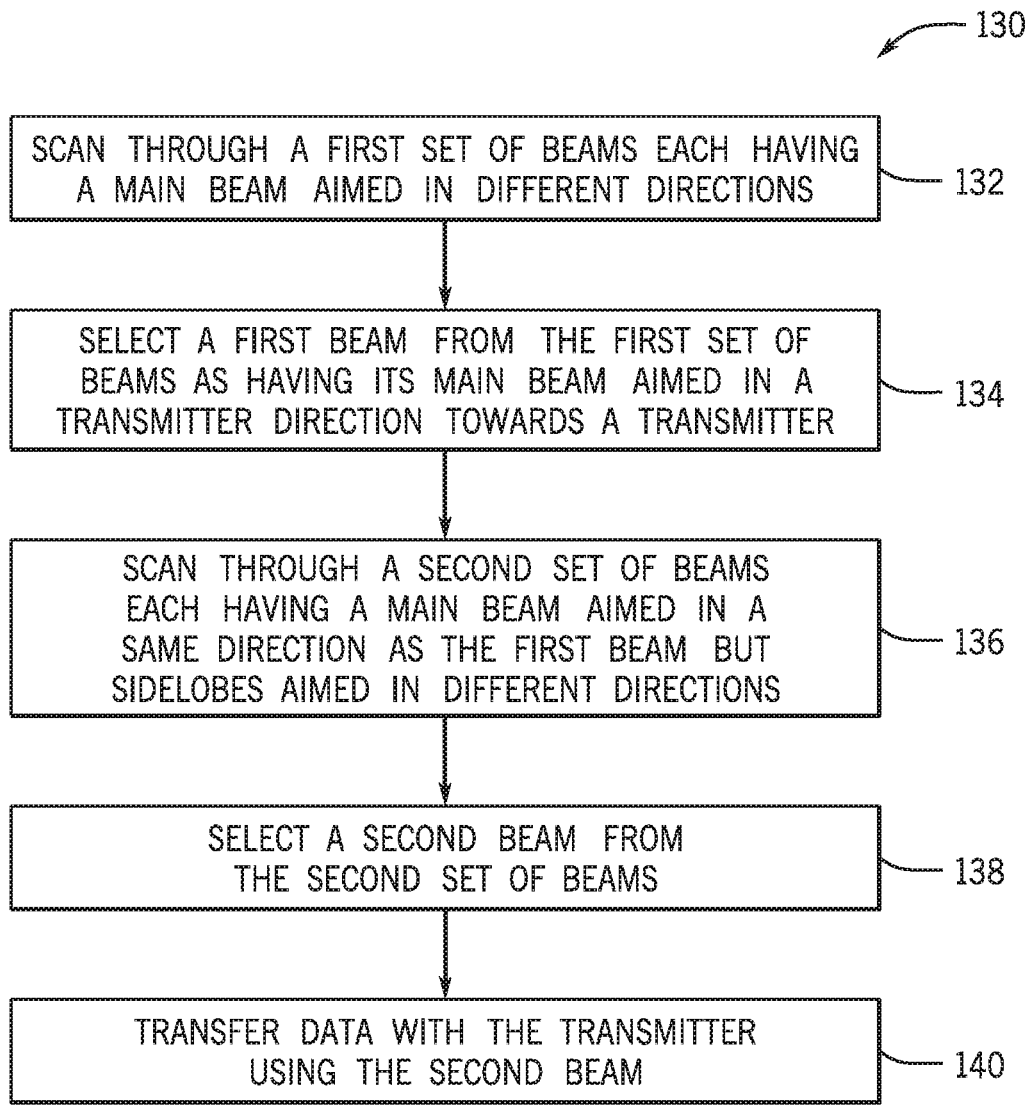
FIG. 9 is a flow diagram of a process for employing a hierarchical beam sweep with a main beam sweep and a diversity beam sweep, in accordance with an embodiment.

In some embodiments, the sweep of the beams may include multiple beams for each direction with different sidelobe directions during an initial sweep. Alternatively, the sweep may be performed hierarchically. FIG. 9 is a flow diagram of a process 130 for employing a hierarchical beam sweep. When trying to establish/update a connection with a transmitter, the UE 100 scans through a first set of beams each having a main beam in different directions (block 132). The first set of beams may be defined using the codebook. The UE 100 then selects a first beam from the first set of beams as the beam having its main beam more closely aimed in a transmitter direction towards the transmitter (block 134). In some embodiments, the scan through the first set of beams may also be broken into hierarchical steps where the first set is divided into different levels of coarseness. A first sweep in the first set of beams uses a coarse scan that skips at least some of the beams. Subsequent sweeps include beams in the first sweep that had higher levels of connectivity with the transmitter plus any previously skipped beams in the first set of beams between the beams in the first sweep that had higher levels of connectivity with the transmitter.

Figure 10:
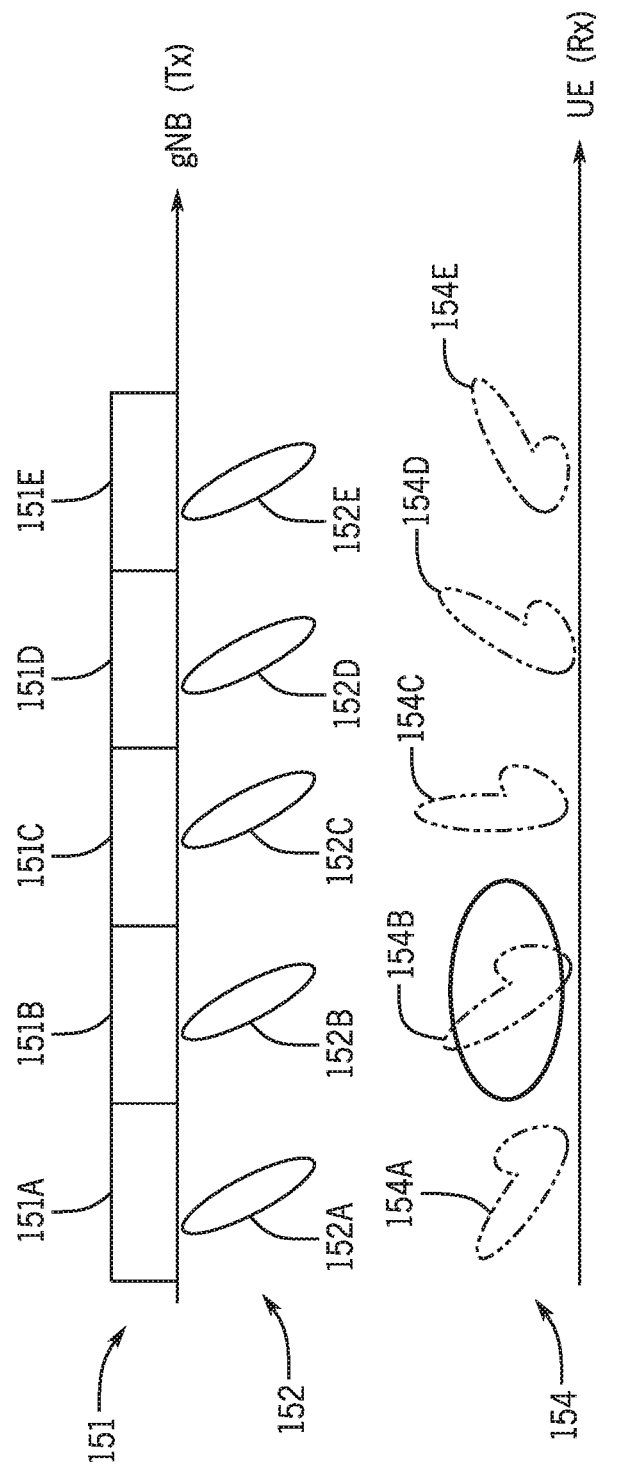
FIG. 10 is an illustration of the main beam sweep of FIG. 9, in accordance with an embodiment.

FIG. 10 illustrates a scan 150 for communication between the UE 100 and the transmitter. Each time slot 151 during the scan pairs a transmitter beam 152 with a UE beam 154. As illustrated, the transmitter beam 152B and the UE beam 154B are most closely aligned due to the UE beam 154B being aimed at the transmitter. Accordingly, the UE selects the UE beam 154B.

Returning to FIG. 9, once a beam is selected with the general direction of the transmitter, the UE 100 scans through a second set of beams (i.e., diversity beams) each having a main beam aimed in a same direction as the first beam but with sidelobes aimed in different directions (block 136). The UE 100 (or the network including the transmitter) may select a second beam from the second set of beams (block 138). As discussed below, the best beam from the second set of beams may be selected using various signal integrity parameters, such as SIR, SINR, signal strength, other similar parameters, or a combination thereof. In some embodiments, the diversity beam scan may be performed immediately after main beam sweeping of the first set of beams. Additionally or alternatively the diversity beam scan may be performed after a time interval has elapsed after the main beam sweeping.

Figure 11:
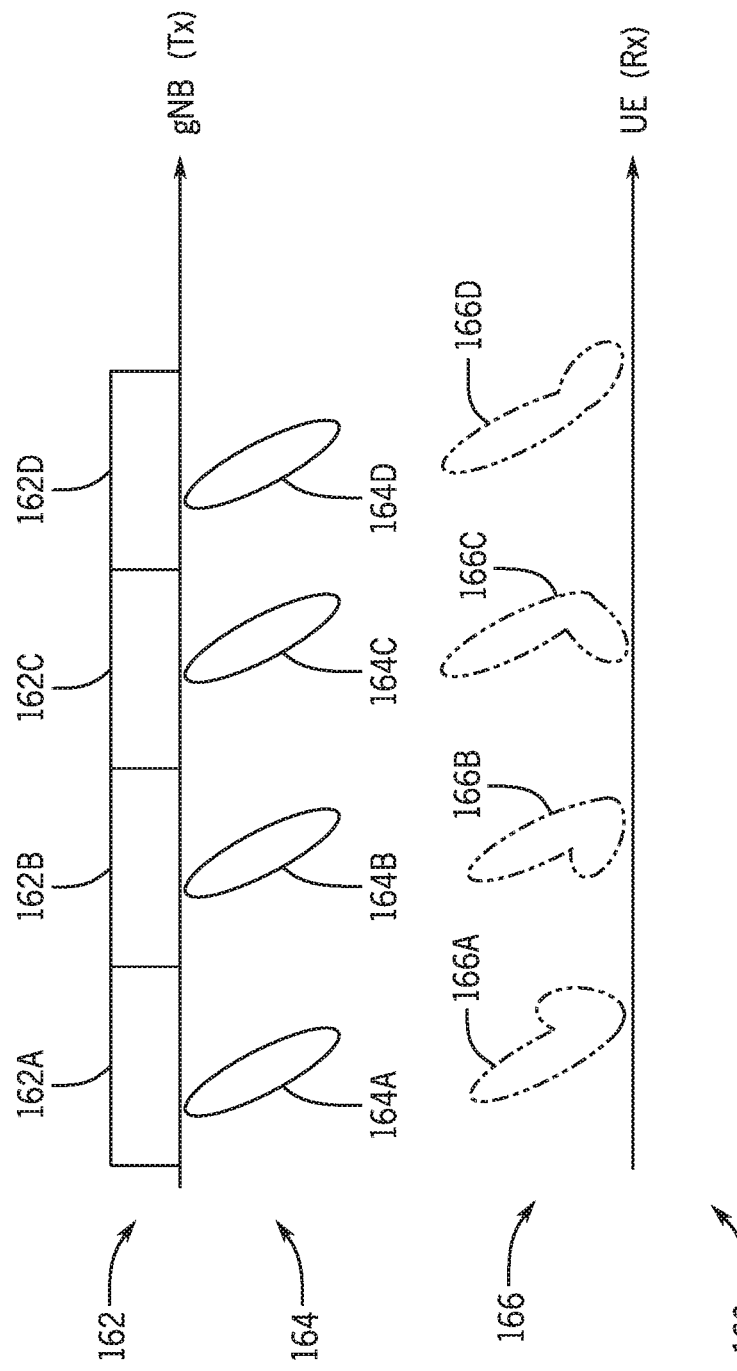
FIG. 11 is an illustration of the diversity beam sweep of FIG. 9, in accordance with an embodiment of the present disclosure.

FIG. 11 illustrates a scan 160 for communication between the UE 100 and the transmitter after a first sweep selects a main beam (e.g., the UE beam 154B). During the scan 160, each time slot 162 pairs a transmitter beam 164 with a UE diversity beam 166 that each has a same general direction as the UE beam 154 from the main beam sweep but has a different direction than other diversity beams.

Returning to FIG. 9, once the first and second beams have been selected, the UE 100 uses the second beam to perform subsequent communications with the transmitter (block 140).

In some embodiments, after a beam for communication has been selected, the UE 100 may still track multiple beams to be able to update beams in case the UE 100 moves or an environment for the UE 100 changes. When diversity beams are available, once a beam is selected towards the transmitter, the rest of the diversity beams associated with the beam (i.e., pointing in the same direction with sidelobes in different directions) may be tracked. More beams pointing at other directions may also be tracked. In some embodiments, these additional beams may be tracked alone. Alternatively, these additional beams may be tracked with associated diversity beams. Once a measurement opportunity occurs, the UE 100 will sweep diversity beams to adapt to an interference change and may select a new diversity beam for the transmitter.

Moreover, when the second beam is selected among the diversity beams of the second set of beams, the UE 100 may identify a dominant interference direction. This dominant interference direction may be used for various actions that may be appropriate due to the UE 100 changing orientation and/or location that may lead to a communication change. For example, when the UE 100 rotates, the direction of the transmitter for the UE 100 has changed relative to its antenna array. By tracking the direction of the transmitter and the dominant interference direction, a new beam may be selected by selecting a beam with a main beam directed at the transmitter and has a null or low sidelobe corresponding to the dominant interference direction.

If the UE 100 moves out of range with the transmitter or the connection to the transmitter is otherwise lost, the UE 100 performs a handover to a new transmitter. The dominant interference direction likely corresponds to another available transmitter making this direction the most likely target for the handover. Therefore, the UE 100 may prioritize the dominant interferer in a scanning list to quickly associating the UE 100 to a new transmitter.

As previously discussed, when determining which diversity beam is most suitable for communications, the signal quality may be measured. Training signals may be sent in the wireless network for channel estimation and beamforming measurements, and these signals may aid in the selection of the diversity beam. For example, a transmitter may send multiple channel state information reference signals (CSI-RS) using a same transmitter beam in downlink signals. The received CSI-RS is received using a receiver beam at each sub-carrier frequency (f) along with any noise and/or interference. Equation 1 below illustrates the composition of the received CSI-RS:

$$Y^{(p)}(f) = H_{serv}^{(p)}(f) X_{serv}(f) + H_{interf}^{(p)}(f) X_{interf}(f) + N(f) \quad \text{(Equation 1)},$$

where $Y^{(p)}(f)$ is the received signal for the pth beam at the frequency f, $H_{serv}^{(p)}(f)$ is the channel from the serving (e.g., target) transmitter for the pth beam at the frequency f, $X_{serv}(f)$ is the transmission signals from the serving transmitter for the pth beam at the frequency f, $H_{interf}^{(p)}(f)$ is the channel from the interfering transmitter for the pth beam at the frequency f, $X_{interf}(f)$ is the transmission signals from the interfering transmitter for the pth beam at the frequency f, N(f) is the noise (e.g., additive white Gaussian noise) at the frequency f. Using a demodulated signal with the Equation 1 enables the UE 100 to estimate the beamformed channel and the interference (plus noise) using the particular receiver beam. For instance, Equation 2 below may be used to generate an estimate for the interference:

$$\tilde{H}^{(p)}(f) = Y^{(p)}(f) X_{serv}^{*}(f) = H_{serv}^{(p)}(f) + I^{(p)}(f) \quad \text{(Equation 2)},$$

where $\tilde{H}^{(p)}(f)$ is an intermediate representation of the overall channel for the pth beam at the frequency f, $X_{serv}^{*}(f)$ is the demodulated training signal at the frequency f, and $I^{(p)}(f)$ is the total interference (and noise) at the frequency f. The channel and the interference values may be estimated using Equation 3 below:

$$\{\hat{H}^{(p)}, I^{(p)}\} = F(H^{(p)}) \quad \text{(Equation 3)},$$

where $\hat{H}^{(p)}$ is an estimate of the overall channel for the pth beam, $I^{(p)}$ is an estimate of the overall interference for the pth beam, and $F(H^{(p)})$ is some function of the overall channel for the pth beam. When multiple diversity beams are available, the UE 100 sweeps the diversity beams during successive beams (successive ps) on the CSI-RS so that the beamformed channel and the interference received by each beam may be measured/estimated. To select which of the signals are to be selected, the signal corresponding to the time slot for the pth channel is selected that maximized some function of $\hat{H}^{(p)}$, $I^{(p)}$. For instance, the function may include SIR of $\hat{H}^{(p)}, I_{(p)}$ a SINR of $\hat{H}^{(p)}, I^{(p)}$, or some combination thereof.

Interference estimation may be performed by the UE 100 (and/or any other electronic device in the network) in frequency domain averaging or in time domain averaging. For instance, for frequency domain, the channel estimation may be filtered in the frequency domain using a filter, such as a sliding window, a minimum mean square error filter, or another suitable filter. For instance, Equation 4 provides an example estimation equation to estimate the channel using filtration:

$$\hat{H}(f) = f(\tilde{H}^{(p)}(f_m)); f_m \in F \quad \text{(Equation 4)},$$

where $f_m$ is a frequency of the training signal, and F is the set of training signals. For example, the filter function may be an average of a moving number (e.g., 3) training signal frequencies. As illustrated in Equation 5, the estimated channel may then be subtracted from the intermediate channel value to estimate the interference (and noise) for the received signal:

$$|I^{(p)}|^2 = \Sigma_f |\tilde{H}^{(p)}(f) - \hat{H}^{(p)}(f)|^2 \quad \text{(Equation 5)}.$$

Similarly, time domain filtering may be used to transform the frequency channel estimation into time domain that may then be filtered using a time domain channel impulse response. For instance, a time domain channel may be translated into the time domain using Equation 6 below:

$$\hat{h}^{(p)}(t) = \text{IFFT}(H^{(p)}(f) + I^{(p)}(f); f \in F) \quad \text{(Equation 6)},$$

where $\hat{h}^{(p)}(t)$ is the time domain channel impulse response at time t. $\hat{h}^{(p)}(t)$ may then be filtered using Equation 7 below:

$$\hat{h}^{(p)}(t) = f(h^{(p)}(\tau); 0 \leq \tau \leq T) \quad \text{(Equation 7)}.$$

For instance, the filter may filter out values of t that are below a threshold value. The average interference power may be calculated by subtracting the filtered channel response from the original channel response as illustrated in Equation 8 below:

$$|\hat{I}^{(p)}|^2 = 1/T \Sigma_{t=0}^{T} |\tilde{h}^{(p)}(t) - \hat{h}^{(p)}(t)|^2 \quad \text{(Equation 8)}.$$

The network (e.g., transmitters) may further aid in interference estimation. For instance, a target transmitter may null signals at a specified frequency enabling the UE 100 to more easily estimate interference during the nulled frequency from the target transmitter. Additionally or alternatively, a transmitter may assist the UE 100 in a co-channel network to estimate interference it generates to the UE 100. For example, the transmitter may broadcast a training sequence so that the co-channel UE 100 can estimate the transmitter's signal strength.

Interference by particular sidelobes may be calculated using Equations 1-8 and the accompanying discussion to evaluate each beam. However, in certain embodiments, interference or SINR measurement may not be available. In these situations, a beam selection may be applied without an interference measurement/estimate by using only a signal strength. For beams with a same peak direction and different sidelobe directions, the power measurement (e.g., LTE reference signal received power (RSRP)) is a target power plus any interference from a particular direction. When the peak gain for two beams is about the same, then a beam having a smallest signal strength may be selected since the difference in the signal strengths may be attributed to interference/noise. Since small peak gain variations exists, a hypothesis may be used to select a smallest interference without measurement.

Figure 12:
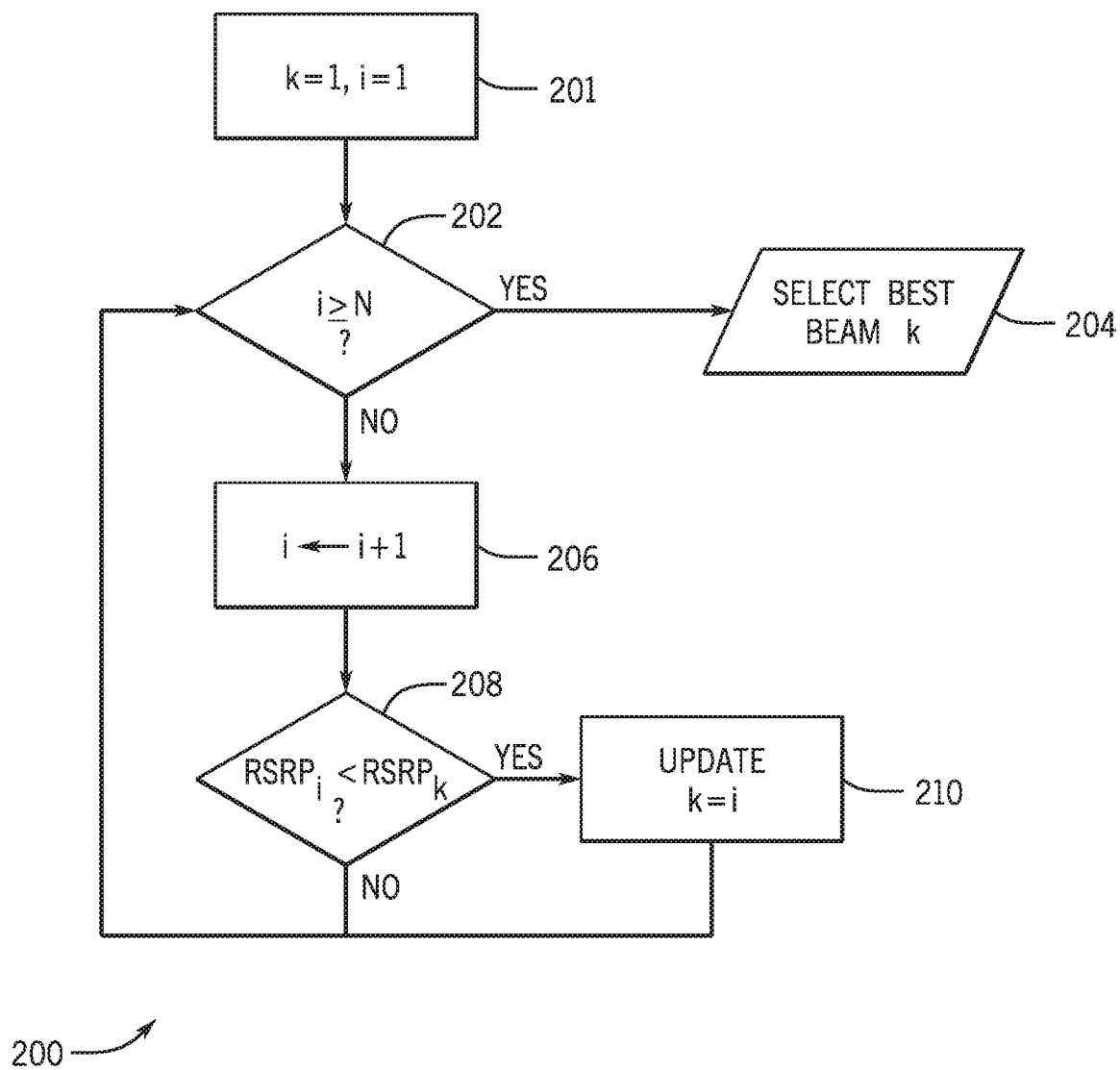
FIG. 12 is a flow diagram of a process for selecting a beam based on signal strength alone, in accordance with an embodiment of the present disclosure.

FIG. 12 is a flow diagram of a process 200 for selecting a beam using signal strength. With a number N beams having a same peak direction and different sidelobe directions, two pointers i and k are initialized to a first beam (block 201). The UE 100 determines whether an index indicated by the first pointer exceeds N (block 202). If the index exceeds N, all beams have been analyzed and a beam indicated by the second pointer is selected as the best beam (block 204). For instance, if only a single beam is transmitted, the single beam may be selected without further evaluation. However if multiple beams are transmitted, the UE 100 increments the first pointer to a next beam (block 206). The UE 100 then compares RSRP of the two beams indicated by the two pointers by determining if the RSRP of the first pointer is less than the RSRP of the second pointer (block 208). If the RSRP of the first pointer is not less than the RSRP of the second pointer, the UE 100 continues analyzing the beams and returns to block 202. However, if the RSRP of the first pointer is less than the RSRP of the second pointer, the UE 100 updates k=i causing the second pointer to point to the newest best beam using signal strength alone before returning to block 202 (block 210). Although the process 200 illustrates a simple selection of a lowest RSRP, in some embodiments, the UE 100 may select a beam with a slightly stronger RSRP while ignoring more strongly high RSRPs. For instance, a buffer value may be used added to the $RSRP_i < RSRP_k$ determination in block 208. Instead, k may remain the same if $RSRPi + \Delta \geq RSRPk > RSRPi$ while $RSRP_i < RSRP_k$, where $\Delta$ is an offset that may be empirically derived to include RSRP variances but avoid selecting a signal with an increased interference. Otherwise, when $RSRP_i < RSRP_k$, i is used to update k. In some embodiments, the offset may be programmable or otherwise selectable to a value greater than normal RSRP variance but less than typical interference levels.

Figure 13:
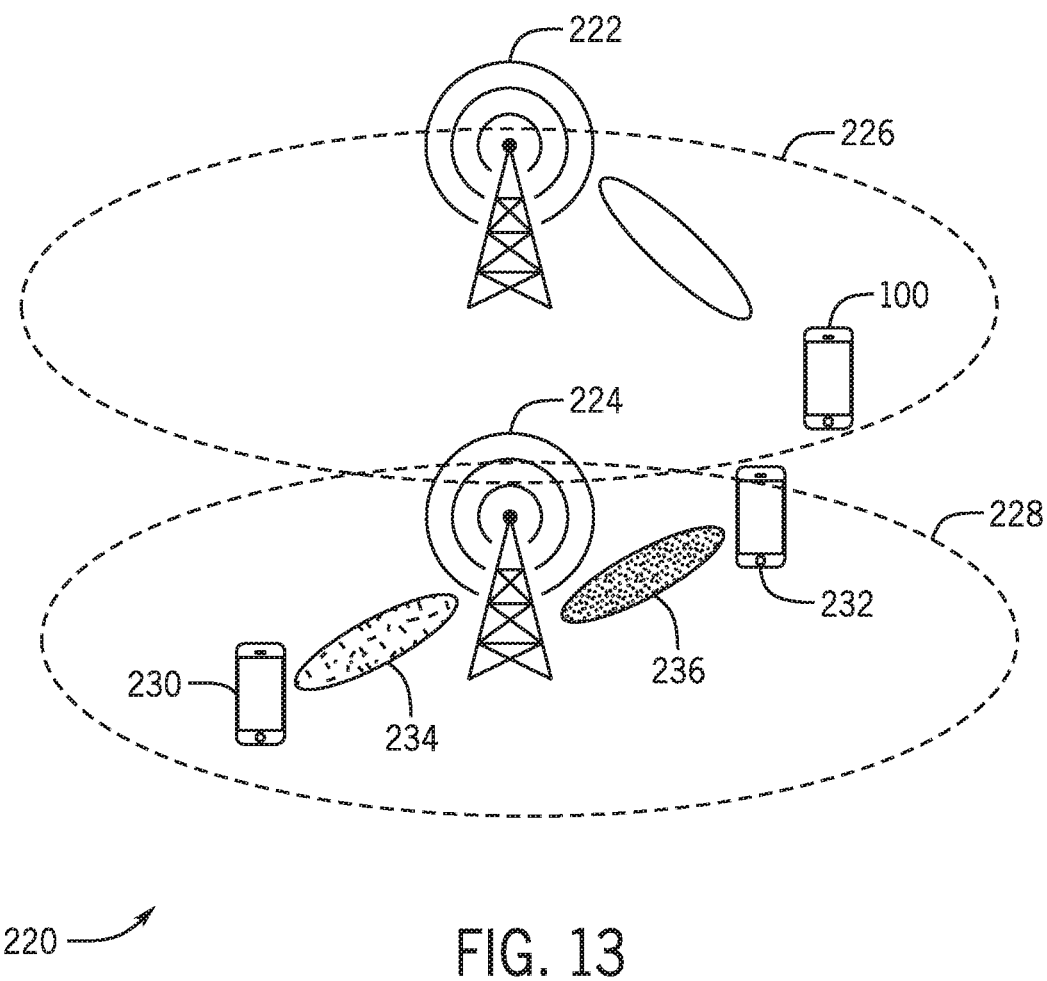
FIG. 13 is an illustration of a network with intermittent or transitory interference, in accordance with an embodiment of the present disclosure.
Figure 14:
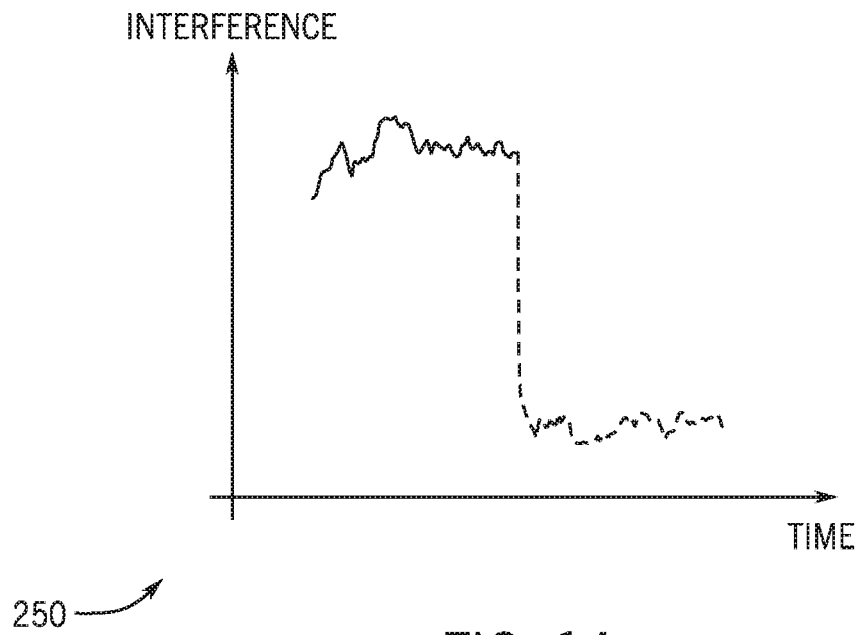
FIG. 14 is a graph of the interference of FIG. 13, in accordance with an embodiment of the present disclosure.

In the field, interference may not be consistent. FIG. 13 is a diagram of a network 220 that includes a target transmitter 222 and an interfering transmitter 224 each having an area of operation 226, 228. The UE 100 communicates with the target transmitter 222. Devices 230 and 232 communicate with the interfering transmitter using beams 234 and 236. In other words, the interfering transmitter 224 also beamforms to its intended receiver, device 230 or 232, that may change over time. For instance, the interfering transmitter 224 may use the beam 236 at one time and the beam 234 later as the intended receiver changes from the device 232 to the device 230. Thus, the measured interference at a particular time (e.g., during one CSI-RS transmission) may correspond to only one beam used at the interfering transmitter 224. Furthermore, the environment between receivers and interferers may change over time causing interference levels to change as well. In either of these scenarios, a graph of interference over time may appear similar to a graph 250 in FIG. 14.

To adjust for this transitory nature of interference, a long-term average may be used to average out the interference variation to select a diversity beam using an average interference. For example, a sliding window of N most recent interference measurements may be used to average the interference measurements. Equation 9 below provides one example sliding window averaging scheme for estimated interference values:

$$\hat{I}_{avg}^{(p)}(t) = \frac{1}{T} \sum_{\tau=t-T}^{t} \hat{I}^{(p)}(\tau) \quad \text{(Equation 9)}$$

Additionally or alternatively, an infinite impulse response (IIR) filter may be applied to interference measurements with a forgetting factor $\alpha$ that controls how quickly older measurements are given significantly less weight in the output of the IIR filter. For instance, Equation 10 below provides one example IIR filter:

$$\hat{I}_{avg}^{(p)}(t) = \alpha \hat{I}_{avg}^{(p)}(t-1) + (1-\alpha) \hat{I}_{avg}^{(p)}(t) \quad \text{(Equation 10)}$$

Figure 15:
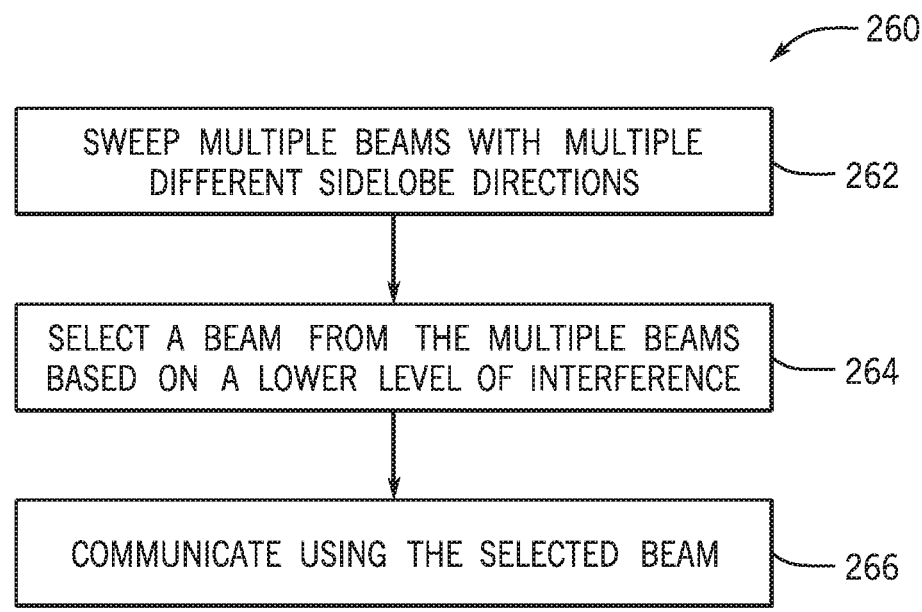
FIG. 15 is a flow diagram of a process used to select and use a diversity beam, in accordance with an embodiment of the present disclosure.

With the foregoing in mind, FIG. 15 is a flow diagram of a process 260 used to select a beam to communicate between the UE 100 and a wireless network base station. The UE 100 sweeps through multiple beams used to communicate with the wireless network base station (block 262). The multiple beams have sidelobes pointing in different directions. In some embodiments, at least some of the multiple beams have similar sidelobes such that there are more beams that different sidelobe directions. Additionally or alternatively, each beam of the multiple beams may have a unique sidelobe direction. In some embodiments, a single sweep may be performed with the multiple beams including main lobes pointing in different directions. Additionally or alternatively, a sweep of divergent main lobes may be performed before a sweep of diversity beams having similar main lobe directions but different sidelobe directions is performed.

The UE 100 selects a beam from the multiple beams based on a lower level of interference for the multiple beams (block 264). In other words, the beam may have the lowest amount of interference. The amount of interference may be measured or estimated using reference signals. Alternatively, the amount of interference may be inferred using a strength of signal for diversity beams.

The UE 100 then communicates with the wireless network base station using the selected beam (block 266). In some embodiments, the UE 100 may still track information about the non-selected beams of the multiple beams. Indeed, in some embodiments, the UE 100 may track the highest level of interference to determine a dominant interference direction. This dominant interference direction may be used when the UE 100 is changes in orientation or is handed off to another wireless network base station.

Figure 16:
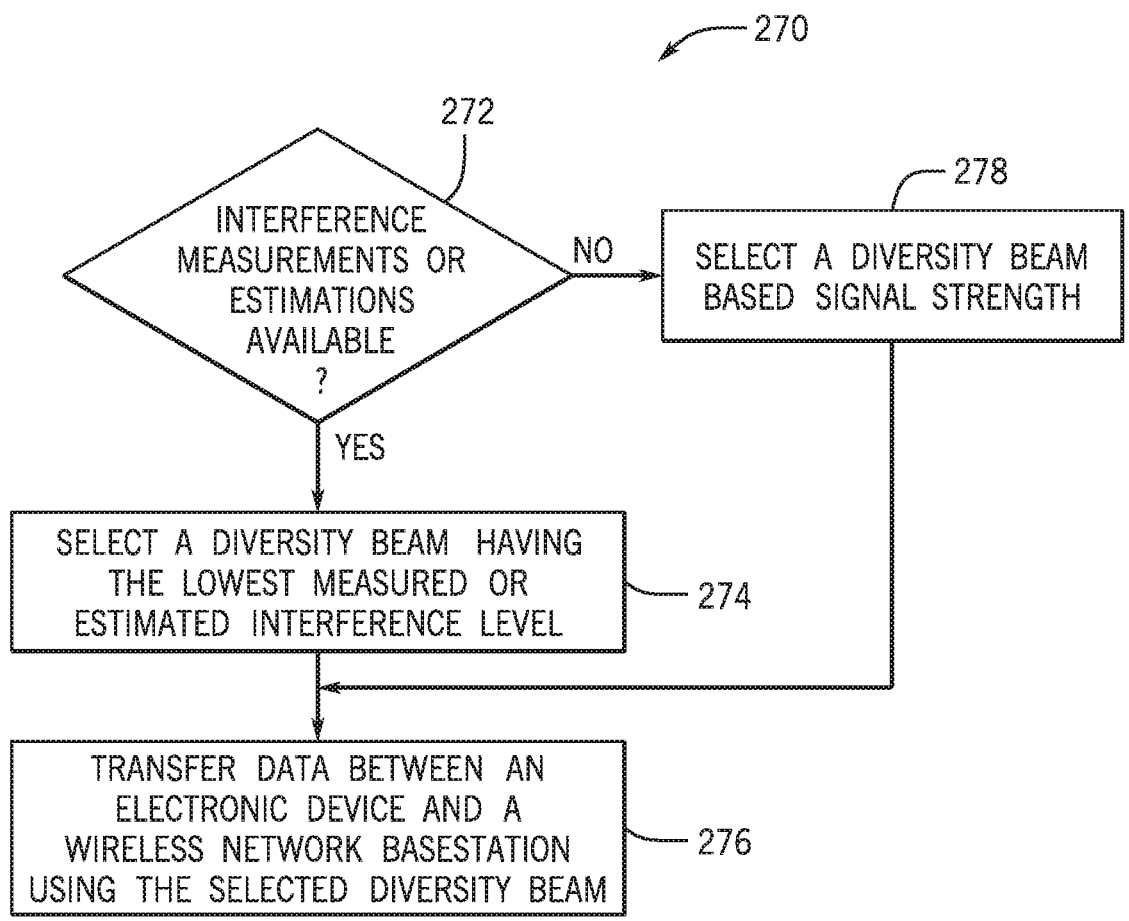
FIG. 16 is a flow diagram of a process to select a method used to select a diversity beam and selecting the diversity beam using the selected method, in accordance with an embodiment of the present disclosure.

FIG. 16 is a flow diagram of a process 270 for selecting a method of selecting a diversity beam. The UE 100 determines whether the interference measurements or estimations are available for diversity beams having similar main lobe directions and divergent sidelobe directions (block 272). Upon a determination that the interference measurements or estimations are available, the UE 100 selects a diversity beam having a lowest measured or estimated interference level for the diversity beams (block 274). The UE 100 then transfers data to a wireless network base station using the selected diversity beam (block 276). However, when interference measurements or estimations are not available, the UE 100 may select a diversity beam based on signal strength alone (block 278). When selecting the diversity beam based on signal strength, the UE 100 may select the diversity beam with the lowest signal strength. Since the peak main lobes are similar for the diversity beams, any large differences in signal strength may be attributed to interference. Thus, instead of purely selecting the smallest signal strength, the UE 100 may attempt to capture the strongest signal strength that is likely due to main beam variance rather than interference. To this point, the UE 100 may select a diversity beam having a signal strength higher than the lowest signal strength as long as the diversity beam has a signal strength less than some offset plus the lowest signal strength.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A method, comprising:
sweeping a plurality of beams used to communicate between a wireless network base station and an electronic device, wherein the plurality of beams comprise beams having a plurality of sidelobe directions;
selecting, using a processor of the electronic device, a beam from the plurality of beams, and wherein selecting the beam comprises selecting the beam having a lowest level of interference of the plurality of beams due to a sidelobe direction of the beam of the plurality of sidelobe directions; and
communicating with the wireless network base station using the selected beam.

2. The method of claim 1, comprising measuring interference at the electronic device using reference signals between the wireless network base station and the electronic device, wherein selecting the beam having the lowest level of interference is based at least in part on the measured interference.

3. The method of claim 1, comprising measuring signal strengths for each of the plurality of beams, wherein selecting the beam having the lowest level of interference is based at least in part on the signal strengths.

4. The method of claim 1, wherein each main beam of each of the plurality of beams all point in a common direction toward the wireless network base station.

5. The method of claim 4, comprising determining the common direction from a sweep of a plurality of direction beams before sweeping the plurality of beams, wherein the plurality of direction beams each have a main beam in a different direction than other beams of the plurality of direction beams.

6. The method of claim 1, wherein at least two of the plurality of beams each have main beams with different directions.

7. The method of claim 1, comprising tracking the plurality of beams after selecting the beam to account for future interference changes.

8. The method of claim 1, comprising identifying a dominant interference direction using the plurality of beams.

9. The method of claim 8, comprising:
disconnecting from the wireless network base station; and
using the dominant interference direction to connect to a new wireless network base station in the dominant interference direction.

10. The method of claim 8, comprising:
determining that a rotation of the electronic device has occurred; and
using the dominant interference direction for selecting a new beam that has a low or null sidelobe in the dominant interference direction.

11. A system comprising:
an antenna array configured to communicate with a base station for a wireless network;
memory storing instructions; and
one or more processors configured to execute the instructions to cause the one or more processors to:
scan, using the antenna array, through a first set of beams in a codebook each having a main beam aimed in a different direction;
select a first beam from the first set of beams as having its main beam aimed in a transmitter direction towards the base station;
in response to the selection of the first beam, scan, using the antenna array, through a second set of beams in the codebook each having a main beam aimed in the transmitter direction but having sidelobes aimed in different directions;
select a second beam from the second set of beams; and
transfer data with the base station using second beam.

12. The system of claim 11, wherein the antenna array is configured to receive channel state information reference signals for each of the second set of beams, wherein the instructions are configured to cause the one or more processors to:
- estimate a beamformed channel for each of the second set of beams using the received channel state information reference signals; and
- estimate interference for each of the second set of beams using the corresponding estimated beamformed channel, wherein selecting the second beam is based at least in part on the estimated interference for the second beam.

13. The system of claim 12, wherein the selecting the second beam comprises selecting the second beam has having a highest signal-to-interference-plus-noise ratio (SINK) of the second set of beams, wherein the SINR is based at least in part on the estimated interference.

14. The system of claim 12, wherein estimating the beamformed channel comprises filtering a measured beamformed channel using the channel state information reference signals.

15. The system of claim 14, wherein filtering the measured beamformed channel comprises performing a sliding window average or minimum mean square error filter in the frequency domain.

16. The system of claim 14, wherein filtering the measured beamformed channel comprises:
- transforming the measured beamformed channel into the time domain;
- filtering a time domain channel impulse response; and
- subtracting the filtered time domain channel impulse response from the time domain channel impulse response.

17. The system of claim 12, wherein estimating interference is based at least in part on the base station nulling its transmissions for a specified frequency to aid the system in estimating the interference.

18. A tangible, non-transitory, and computer-readable medium storing instructions that, when executed by one or more processors, are configured to cause the one or more processors to:
- determine whether interference measurements or estimations are available for each of a plurality of diversity beams having similar main lobe directions and divergent sidelobe directions;
- upon a determination that interference measurements or estimations are available, select a diversity beam having a lowest measured or estimated interference level for the plurality of diversity beams; and
- transfer data between an electronic device and a wireless network base station using the selected diversity beam.

19. The tangible, non-transitory, and computer-readable medium of claim 18, wherein the instructions are configured to cause the one or more processors to, upon a determination that interference measurements or estimations are not available, select the diversity beam based on signal strengths of the plurality of diversity beams.

20. The tangible, non-transitory, and computer-readable medium of claim 19, wherein the instructions are configured to cause the one or more processors to select the diversity beam as having a lowest signal strength of the plurality of diversity beams.

21. The tangible, non-transitory, and computer-readable medium of claim 19, wherein the instructions are configured to cause the one or more processors to select the diversity beam as having a signal strength above a lowest signal strength of the plurality of diversity beams but below an offset plus the lowest signal strength.

* * * * *